US009059772B2

(12) United States Patent
Coldrey et al.

(10) Patent No.: US 9,059,772 B2
(45) Date of Patent: Jun. 16, 2015

(54) MULTI-ANTENNA DEVICE

(75) Inventors: Mikael Coldrey, Landvetter (SE);
Fredrik Athley, Kullavik (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/642,233

(22) PCT Filed: Apr. 22, 2010

(86) PCT No.: PCT/EP2010/055338
§ 371 (c)(1),
(2), (4) Date: Oct. 19, 2012

(87) PCT Pub. No.: WO2011/131242
PCT Pub. Date: Oct. 27, 2011

(65) Prior Publication Data
US 2013/0034129 A1    Feb. 7, 2013

(51) Int. Cl.
*H04K 1/10*    (2006.01)
*H04L 27/28*    (2006.01)
*H04B 7/155*    (2006.01)

(52) U.S. Cl.
CPC ................................ *H04B 7/15564* (2013.01)

(58) Field of Classification Search
CPC .................................................. H04B 7/15564
USPC .................................. 375/260, 267, 295, 316
See application file for complete search history.

(56) References Cited

U.S. PATENT DOCUMENTS

| 8,228,878 | B2 * | 7/2012 | Larsson et al. ................. 370/335 |
| 8,244,190 | B2 * | 8/2012 | Larsson et al. ................. 455/78 |
| 2006/0193294 | A1 * | 8/2006 | Jorswieck et al. ............ 370/334 |
| 2008/0274692 | A1 * | 11/2008 | Larsson ......................... 455/24 |
| 2010/0067362 | A1 * | 3/2010 | Sakaguchi et al. ............ 370/203 |
| 2011/0216813 | A1 * | 9/2011 | Baldemair et al. ............ 375/211 |

FOREIGN PATENT DOCUMENTS

| WO | 2008004916 A1 | 1/2008 |
| WO | 2008147269 A1 | 12/2008 |

OTHER PUBLICATIONS

Garcia, "Singular Value Decomposition (SVD) A Fast Track Tutorial", Retrieved from the Internet: http://www.miislita.com/information-retrieval-tutorial/singular-value-decomposition-fast-track-tutorial.pdf, Sep. 6, 2009, 5 pages; XP-002616680.
Larsson, et al., "MIMO On-Frequency Repeater with Self0Interference Cancellation and Mitigation", IEEE 69th Vehicular Conference, Apr. 26-29, 2009, pp. 1-5, XP031474618.
Spencer, et al., Zero-Forcing Methods for Downlink Spatial Multiplexing in Multiuser MIMO Channels, IEEE Transactions on Signal Processing, vol. 52, No. 2, Feb. 2004, XP011105731.

* cited by examiner

*Primary Examiner* — Freshteh N Aghdam
(74) *Attorney, Agent, or Firm* — Rothwell, Figg, Ernst & Manbeck, P.C.

(57) ABSTRACT

The invention provides a method for self-interference suppression in a multi-antenna device that is part of a communication channel between a transmitter and a receiver of a wireless communication system. The communication system uses the multi-antenna device, the multi-antenna device is located between the transmitter and the receiver and uses antennas and a relay unit forwarding signals from the transmitter to the receiver. The communication channel has a transmit channel, defined by a transmit channel matrix between the transmitter and the multi-antenna device, a receive channel defined by a receive channel matrix, between the multi-antenna device and the receiver and a self-interference channel between an output and an input side of the multi-antenna device. The self-interference channel is defined by a self-interference channel matrix wherein the method comprises the steps of: • quipping the multi-antenna device with at least three antennas and; • suppressing the self-interference channel by using at least one filtering matrix arrangement being inserted between the antennas and the relay unit. The invention also provides a node in a wireless communication system comprising the multi-antenna device for self-interference suppression in the multi-antenna device module that is part of a communication channel.

17 Claims, 5 Drawing Sheets

MULTI-ANTENNA DEVICE

CROSS-REFERENCE TO RELATED APPLICATION

This application is a 35 U.S.C. §371 National Phase Entry Application from PCT/EP2010/055338, filed Apr. 22, 2010, and designating the United States, the disclosure of which is incorporated by reference herein.

TECHNICAL FIELD

The present invention relates to the field of multi-antenna relays that operates between a transmitter and a receiver with the purpose to receive, possibly enhance and forward signals.

BACKGROUND

A relay is used between a transmitter and receiver when the received signals at the receiver otherwise should be too weak. When the term relay is mentioned it can either be an amplify-and-forward (AF) relay which is sometimes called a repeater or it can be a decode-and-forward (DF) relay. In the literature one can also find relays with functionality in-between AF and DF and one such example is an Estimate and Forward (EF) relay.

A known problem with relays is the self-interference caused by poor isolation between the output and input of the relay. The self-interference will heavily limit the performance of a relay. For example, the amplification gain of an AF relay and the detection performance of a DF relay are both limited by the isolation. For a relay to properly serve its purpose, which is to increase the end-to-end (E2E) performance, it is of importance that the isolation problem is solved.

Existing technologies for relay self-interference mitigation include e.g:
Half-duplex operation, either Time Division Duplex (TDD) or Frequency Division Duplex (FDD) and
Orthogonal receive and transmit antenna polarizations.

One way to eliminate the self-interference is to operate the relay in half-duplex mode. That is, the relay is not receiving and transmitting at the same time, TDD, or at the same frequency, FDD, and thus has infinite isolation between input and output. Half-duplex operation, however, incurs a capacity loss, of 50% usually. This dramatic loss of capacity is not acceptable and other solutions for increasing the isolation are needed. One such solution for an on-frequency relay (on-frequency operation means that the relay receives and forwards on the same frequency) is to use antenna techniques such as e.g. orthogonal polarizations on receive and transmit sides. However, since the polarization of the user equipment (UE) most likely is unknown it might therefore be desirable to transmit the forwarded signals over two orthogonal polarizations in order to prevent polarization mismatch between relay and UE. Thus, one might not want to sacrifice one of the polarizations for self-interference reduction.

There is thus a need to suppress self-interference between the output and input of the relay without the drawbacks described above of reduced capacity of half-duplex operation or use of orthogonal polarizations.

SUMMARY

The object of the invention is to reduce at least some of the mentioned deficiencies with the prior art solutions and to provide:

a method for self-interference suppression and channel protection and
a node in a wireless communication network between a transmitter and a receiver to solve the problem of suppressing self-interference between the output and input of a multi-antenna device, such as a relay, without the drawbacks described above of reduced capacity or use of orthogonal polarizations.

The object is achieved by providing a method for self interference suppression in a multi-antenna device that is part of a communication channel between a transmitter and a receiver of a wireless communication system. The communication system uses the multi-antenna device, the multi-antenna device being located between the transmitter and the receiver, and uses antennas and a relay unit for forwarding signals from the transmitter to the receiver. The communication channel has a transmit channel, defined by a transmit channel matrix between the transmitter and the multi-antenna device, a receive channel defined by a receive channel matrix, between the multi-antenna device and the receiver and a self-interference channel between an output and an input side of the multi-antenna device. The self-interference channel is defined by a self-interference channel matrix wherein the method comprises the steps:
  equipping the multi-antenna device with at least three antennas of which at least one antenna is an input antenna located at the input side facing the transmit channel and at least one antenna is an output antenna located at the output side facing the receive channel and;
  suppressing the self-interference channel by using at least one filtering matrix arrangement being inserted between the antennas and the relay unit at a side of the multi-antenna device having at least two antennas, each of said filtering matrix arrangement being defined by a filtering matrix, said filtering matrix arrangement cancelling at least one eigenmode of the self-interference channel, by choosing the columns of the filtering matrix to be orthogonal to said at least one eigenmode of the self-interference channel that is/are to be cancelled.

The object is further achieved by a node in a wireless communication system comprising a multi-antenna device for self-interference suppression in the multi-antenna device that is part of a communication channel between a transmitter and a receiver of a wireless communication system. The communication system comprises the multi-antenna device, the multi-antenna device being located between the transmitter and the receiver, and comprises antennas and a relay unit for forwarding signals from the transmitter to the receiver. The communication channel comprises a transmit channel, defined by a transmit channel matrix, between the transmitter and the multi-antenna device, a receive channel, defined by a receive channel matrix, between the multi-antenna device and the receiver and a self-interference channel between an output and an input side of the multi-antenna device. The self-interference channel is defined by a self-interference channel matrix, wherein:
  the multi-antenna device comprises at least three antennas of which at least one antenna is an input antenna located at the input side facing the transmit channel and at least one antenna is an output antenna located at the output side facing the receive channel and;
  at least one filtering matrix arrangement is inserted between the antennas and the relay unit at a side of the multi-antenna device comprising at least two antennas, each of said filtering matrix arrangement being defined by a filtering matrix, said filtering matrix arrangement being arranged to cancel at least one eigenmode of the self-interference channel, by the columns of the filtering matrix being arranged to be orthogonal to said at least one eigenmode of the self-interference channel that is/are to be cancelled.

In one example of the method of the invention the transmit channel matrix, the receive channel matrix and the self-interference matrix are updated in a channel updating module.

In one example of the method of the invention a decomposition is performed on the self-interference matrix dividing the self-interference matrix in a number of eigenmodes and wherein said filtering matrix is constituted of vectors that are orthogonal to said at least one eigenmode of the self-interference channel that is/are to be cancelled.

In one example of the method of the invention the decomposition is accomplished by the multi-antenna device performing a Singular Value Decomposition, SVD, on the self-interference channel matrix ($H_0$). The SVD of the self-interference channel matrix ($H_0$) is given by:

$$H_0 = U_0 S_0 V_0^H$$

where $U_0$ is a unitary $N_1 \times N_1$ matrix, $N_1$ being the number of input antennas, containing left singular vectors. $S_0$ is a diagonal $N_1 \times N_2$ matrix, $N_2$ being the number of output antennas, containing the singular values along its main diagonal in a decreasing order. $V_0$ is a unitary $N_2 \times N_2$ matrix containing right singular vectors and $V_0^H$ is the complex conjugate transpose of $V_0$.

In one example of the method of the invention two filtering matrices are used. The self-interference suppression by cancelling a certain eigenmode is made with the filtering matrix arrangement meeting a selection criterion for minimizing risk of loss of one or several dominating eigenmodes of the transmit channel and/or the receive channel.

In one example of the method of the invention the selection criterion is a power loss criterion where the amount of power lost in the transmit channel by applying the receive filtering matrix arrangement for cancellation of a certain eigenmode is compared to the power lost in the receive channel by applying the transmit filtering matrix arrangement for cancellation of the same certain eigenmode and the filtering matrix arrangement giving the lowest power loss is selected.

In one example of the method of the invention the receive filtering matrix arrangement and the transmit filtering matrix arrangement are cancelling different eigenmodes of the self-interference channel.

In one example of the node of the invention the filtering matrix arrangement has an antenna side and a relay side, the antenna side having separate connections to each antenna located at one of the sides of the multi-antenna device and the relay side having connections to the relay unit.

In one example of the node of the invention the wireless communication system is an Orthogonal Frequency Division Multiplexing, OFDM, system.

In one example of the node of the invention two filtering matrix arrangements are used, a receive filtering matrix arrangement, defined by a receive filtering matrix $W_r$ and a transmit filtering matrix arrangement, defined by a transmit filtering matrix $W_t$. An input end at the antenna side of the receive filtering matrix arrangement is connected to the input antennas and an output end at the relay side to the relay unit. An input end at the relay side of the transmit filtering matrix arrangement is connected to the relay unit and an output end at the antenna side to the output antennas. The arrangements for the receive filtering matrix and the transmit filtering matrix can be separate units or fully or partly integrated with the relay unit.

In one example of the node of the invention the receive and/or transmit filtering matrix arrangements comprise input ports arranged to feed received signals to a Processor module and output ports arranged to deliver output from the receive and/or transmit filtering matrix arrangement. The Processor module comprises:
  decomposition software arranged to perform decomposition of the self-interference matrix dividing the self-interference matrix in a number of eigenmodes, said filtering matrix being constituted of those singular vectors of the self-interference matrix that are orthogonal to said at least one eigenmode of the self-interference channel that is/are to be cancelled and
  filter software arranged to perform a multiplication of a received signal vector from the input antennas at the multi-antenna device with the receive filtering matrix $W_r$ and/or a multiplication of a transmitted signal vector from the relay unit with the transmit filtering matrix $W_t$ and to output the result to the output ports.

In one example of the node of the invention the relay unit comprises functions for amplifying the signals. The multi-antenna device is thus operating as an Amplify and Forward, AF, relay
  or
the relay unit also comprises a function for error correction prior to forwarding, the multi-antenna device thus operating as a Decode and Forward, DF, relay.

In one example of the node of the invention:
  the channel matrices are arranged to be updated in a channel updating module by standard means such as pilot signals,
  the updated channel matrices are fed to a calculation module arranged for calculation of the filtering matrices and the selection criteria based on the updated channel matrices and
  the channel updating module and the calculation module can be separate units in the multi-antenna device or partly or fully integrated with the relay unit.

Additional advantages are achieved by implementing one or several of the features of the dependent claims not mentioned above, as will be explained below.

DETAILED DESCRIPTION

The invention will now be described with reference to the enclosed drawings.

Henceforth in the description vectors are denoted in bold and italic. Matrices are denoted with capital letters in italic. Matrix indices in formulas follow Matlab notations.

Figure 1:
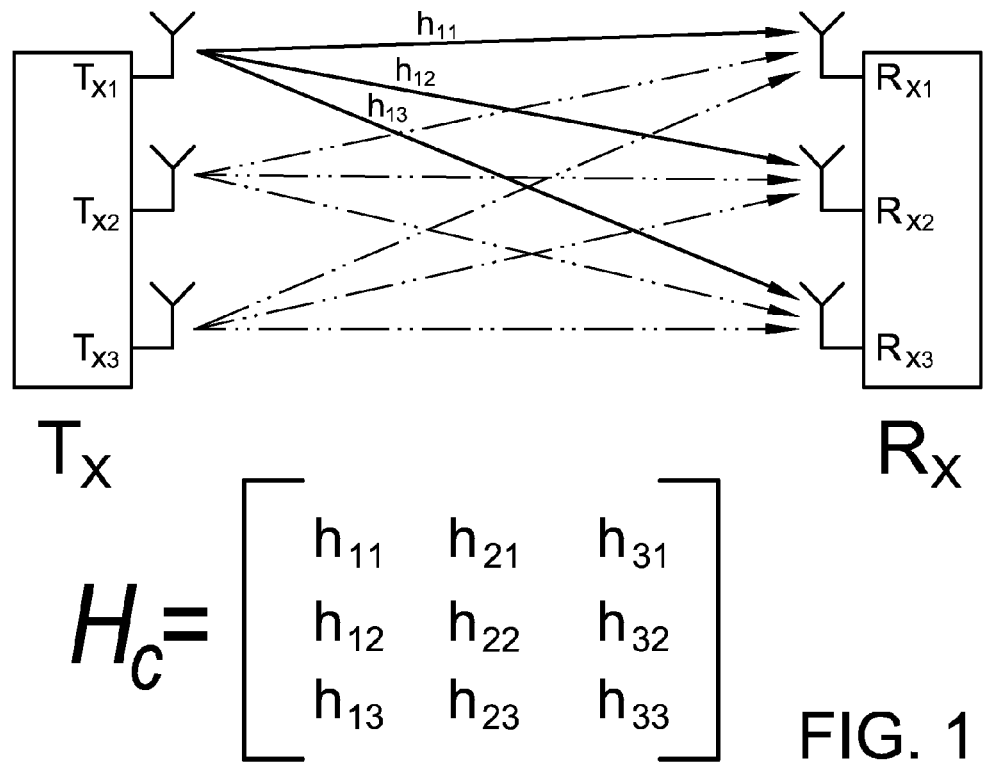
FIG. 1 schematically shows a MIMO communication channel without a relay function.

FIG. 1 schematically shows an example of a Multiple Input Multiple Output (MIMO) communication channel with a Transmitter, Tx, having three output antennas $T_{x1}$-$T_{x3}$ and a receiver, Rx, having three input antennas $R_{x1}$-$R_{x3}$. In this example there is one data stream per antenna, in other examples several data streams can be mixed on the same antenna. This mixing of data streams is called precoding and can be used e.g. for beam forming purposes. The antenna $T_{x1}$ transmits a signal to each of $R_{x1}$, $R_{x2}$ and $R_{x3}$. A channel coefficient $h_{11}$ defines attenuation and phase shift between $T_{x1}$ and $R_{x1}$. Channel coefficient $h_{12}$ defines attenuation and phase shift between $T_{x1}$ and $R_{x2}$ and channel coefficient $h_{13}$ defines attenuation and phase shift between $T_{x1}$ and $R_{x3}$. The channel between $T_{x1}$ and all the receive antennas can be represented by a channel vector $h_1=[h_{11}, h_{12}, h_{13}]$. In the same way the channel between $T_{x2}$ and all the receive antennas can be represented by a channel vector $h_2=[h_{21}, h_{22}, h_{23}]$ and the channel between $T_{x3}$ and all the receive antennas with a channel vector $h_3=[h_{31}, h_{32}, h_{33}]$. In a digital communication channel the information from Tx is thus in this example transmitted in multiple data streams over the communication channel represented by the three channel vectors $h_1$, $h_2$ and $h_3$. The communication channel can then be represented by a matrix Hc having the three channel vectors $h_1$, $h_2$ and $h_3$ as columns in the Hc matrix as shown in FIG. 1. The communication channel Hc is said to have full rank if the three channel vectors $h_1$, $h_2$ and $h_3$ are linearly independent. In a communication channel with multipath propagation and scattering of the signals between the transmitter and receiver this is often, but not necessarily always, the case. The maximum rank of the communication channel Hc in this example is thus 3. In general, the maximum possible rank is limited by the number of antennas at the transmit or receive side having the least number of antennas.

Figure 2:
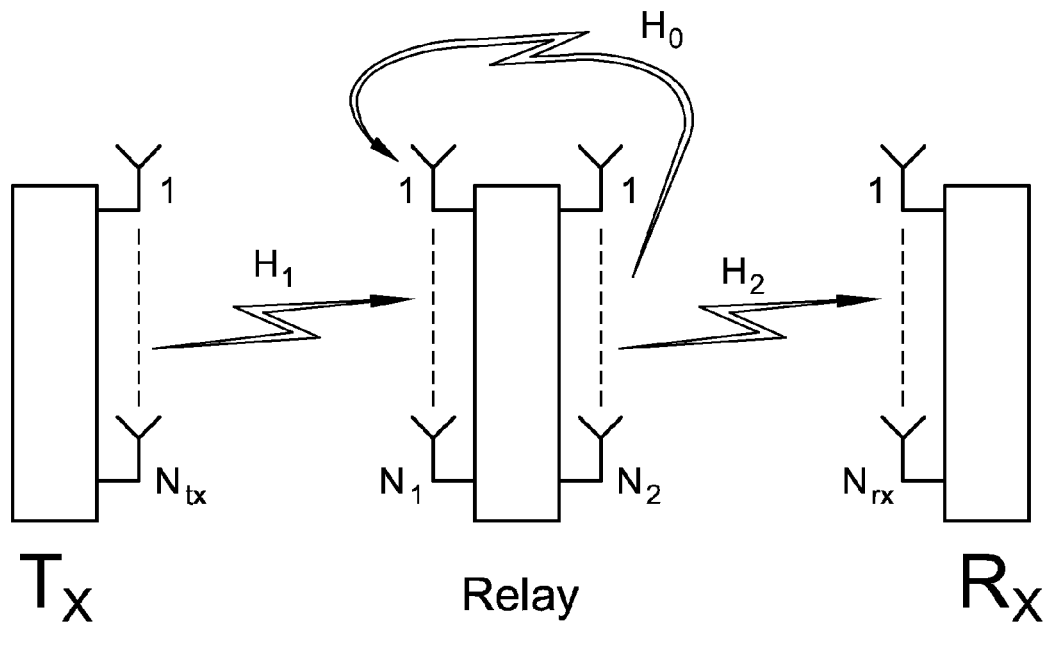
FIG. 2 schematically shows an example of a relayed MIMO communication channel according to prior art.

A relayed communication channel according to prior art is depicted in FIG. 2. The direct channel between the Tx and the Rx is omitted since it is assumed that it is very weak compared to the relayed channel. A weak direct channel is actually the motivation for installing a relay between the Tx and Rx. Besides, the direct channel is independent of the self-interference channel and does not provide any information on how to suppress it. Thus we have three channels; a transmit channel between the Tx and a relay input defined by a transmit channel matrix $H_1$, a receive channel which is a channel between a relay output and the Rx defined by a receive channel matrix $H_2$, and finally a self-interference channel between the relay output and input defined by a self-interference channel matrix $H_0$. The self-interference channel is the channel to be suppressed. The transmitter has $N_{tx}$ antennas, the receiver N, antennas and the relay has $N_1$ input antennas and $N_2$ output antennas.

Figure 3:
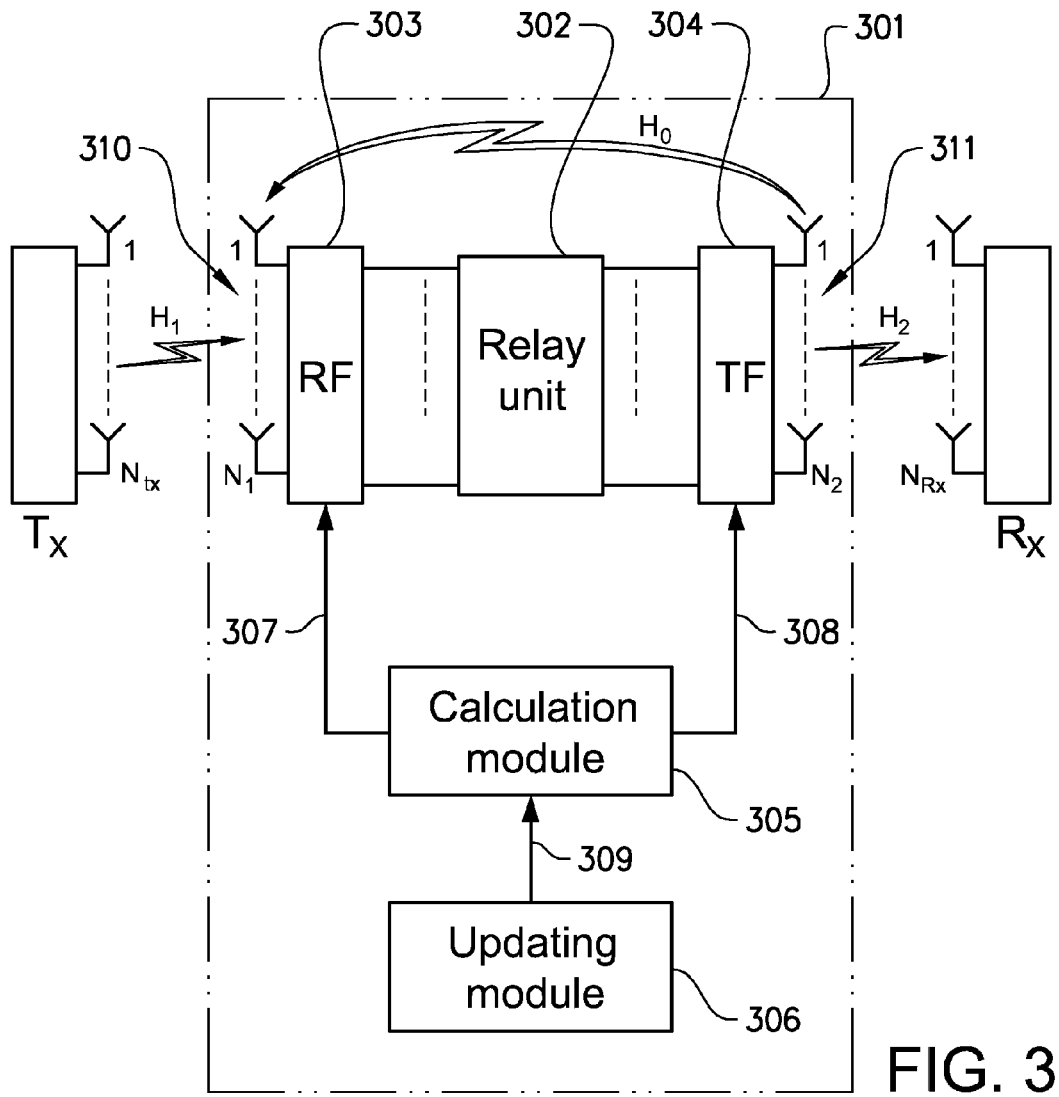
FIG. 3 schematically shows an example of a node according to the invention.

FIG. 3 schematically shows an example of a node according to the invention. The node comprises a multi-antenna device 301 for self-interference suppression in the multi-antenna device that is part of a communication channel between a transmitter and a receiver of a wireless communication system. The communication system comprises the multi-antenna device 301, the multi-antenna device being located between the transmitter and the receiver in the same way as the relay of FIG. 2 is located between the transmitter and the receiver. The multi antenna device comprises antennas and a relay unit 302 for forwarding signals from the transmitter to the receiver. The antennas comprise input antennas $1 \ldots N_1$ located at an input side of the multi-antenna device and output antennas $1 \ldots N_2$ located at an output side of the multi-antenna device. The communication channel comprises a transmit channel, defined by a transmit channel matrix $H_1$, between the transmitter and the multi-antenna device, a receive channel, defined by a receive channel matrix $H_2$, between the multi-antenna device and the receiver and a self-interference channel between an output and an input side of the multi-antenna device. The self-interference channel is defined by the self-interference channel matrix $H_0$.

The multi-antenna device 301 comprises at least three antennas 310, 311 of which at least one antenna is an input antenna 310 located at the input side facing the transmit channel. At least one antenna is an output antenna 311, located at the output side facing the receive channel.

The multi-antenna device further comprises at least one filtering matrix arrangement RF, TF which is inserted between the antennas and the relay unit 302 at a side of the multi-antenna device 301 comprising at least two antennas. Each of said filtering matrix arrangement is defined by a filtering matrix. As will be explained, said filtering matrix arrangement is arranged to cancel at least one eigenmode of the self-interference channel, by arranging the columns of the filtering matrix to be orthogonal to said at least one eigenmode of the self-interference channel that is/are to be cancelled. The filtering matrix arrangement is also called a receive filter when it is inserted at the input side of the multi-antenna device and a transmit filter when it is inserted at the output side of the multi-antenna device.

For the skilled person eigenmode is a well know property of a MIMO communication channel such as a self-interference channel. Eigenmode will be further discussed and explained in association with describing decomposition of the self-interference matrix which is defining the self-interference channel.

Each filtering matrix arrangement RF, TF has an antenna side and a relay side, the antenna side having separate connections to each antenna located at one of the sides of the multi-antenna device and the relay side having connections to the relay unit.

In the example of FIG. 3 there is a receive filtering matrix arrangement or receive filter RF, 303, defined by a receive filtering matrix $W_r$ and a transmit filtering matrix arrangement or transmit filter TF, 304, defined by a transmit filtering matrix $W_t$. The receive filtering matrix arrangement is inserted between the input antennas, 310, $1 \ldots N_1$ and the relay unit 302. The antenna side of the receive filtering matrix arrangement thus has $N_1$ separate connections to each of the $N_1$ input antennas and the relay side has a number of connections to the relay unit. The number of such connections on the relay side depends on the size of the receive filtering matrix. The transmit filtering matrix arrangement is inserted between the output antennas, 311, $1 \ldots N_2$ and the relay unit 302. The antenna side of the transmit filtering matrix arrangement thus has $N_2$ separate connections to each of the $N_2$ output antennas and the relay side has a number of connections to the relay unit. The number of connections on the relay side depends on the size of the transmit filtering matrix.

The multi-antenna device further comprises a calculation module 305 and an updating module 306. These modules will be further explained below.

The invention also includes a method for self-interference suppression in a multi-antenna device 301 that is part of a communication channel between a transmitter Tx and a receiver Rx of a wireless communication system. The communication system uses the multi-antenna device, the multi-antenna device is located between the transmitter and the receiver and uses antennas and a relay unit 302 for forwarding signals from the transmitter to the receiver. The communication channel has a transmit channel, defined by a transmit channel matrix $H_1$ between the transmitter and the multi-antenna device, a receive channel defined by a receive channel matrix $H_2$, between the multi-antenna device and the receiver and a self-interference channel between the output and the input side of the multi-antenna device. The self-interference channel is defined by a self-interference channel matrix $H_0$. The method comprises the steps of:

equipping, 401, the multi-antenna device 301 with at least three antennas 310, 311 of which at least one antenna is an input antenna 310 located at the input side facing the transmit channel and at least one antenna 310, 311 is an output antenna 311 located at the output side facing the receive channel and;

suppressing, 402, the self-interference channel by using at least one filtering matrix arrangement RF, TF being inserted between the antennas 310, 311 and the relay unit at a side of the multi-antenna device having at least two antennas, each of said filtering matrix arrangement RF, TF being defined by a filtering matrix, said filtering matrix arrangement cancelling at least one eigenmode of the self-interference channel, by choosing the columns of the filtering matrix to be orthogonal to said at least one eigenmode of the self-interference channel that is/are to be cancelled.

Figure 4:
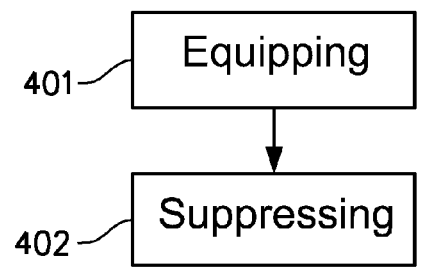
FIG. 4 shows basic method steps of the invention.

FIG. 4 schematically shows the method steps comprising equipping, 401, the multi-antenna device with at least three antennas and suppressing, 402, the self-interference channel using at least one filtering matrix arrangement as described above.

The method can be applied for use in a wireless communication system being an Orthogonal Frequency Division Multiplexing, OFDM, system and the node can be made for operation in a wireless communication system being an Orthogonal Frequency Division Multiplexing, OFDM, system. The method can also be applied for, and the node can be made for, operation in other wireless communication systems such as Code Division Multiple Access, CDMA, Time Division Multiple Access, TDMA, or a single carrier system.

We assume that the transmit, the receive and the self-interference channels defined by matrices $H_0$, $H_1$, and $H_2$ are known at the multi-antenna device. $H_0$ can be estimated at the multi-antenna device from the same pilot signal as the Rx uses for estimating the receive channel defined by the receive channel matrix $H_2$. This is a standard procedure well known to the skilled person. $H_1$ can be estimated at the multi-antenna device from the pilot transmitted from the Tx. However, $H_2$ has to be fed back from the receiver in a FDD system or estimated on the reciprocal reverse channel in a TDD system. This is also a well know procedure to the skilled person and therefore not further discussed here. Solutions will also be outlined in the situation when $H_2$ is unknown at the multi-antenna device. For now, it is however assumed that $H_2$ is known. It is also assumed that, in the described example of the invention, operation is performed per narrowband subcarrier in an OFDM system, hence, in the described example, narrowband channels are assumed.

The received $N_1 \times 1$ signal vector ($N_1$ rows and 1 column) at the multi-antenna device is represented as:

$$x = H_1 s + H_0 y + n_1$$

where $H_1$ is the $N_1 \times N_{tx}$ ($N_1$ rows and $N_{tx}$ columns) MIMO transmit channel matrix between the Tx and the multi-antenna device, s is the transmitted $N_{tx} \times 1$ signal vector from the Tx, $H_0$ is the $N_1 \times N_2$ self-interference MIMO channel matrix between the output side and the input side of the multi-antenna device, y is the transmitted $N_2 \times 1$ signal vector from the multi-antenna device and $n_1$ is a $N_1 \times 1$ noise vector at the input side of the multi-antenna device. The size of a vector and matrix is denoted in the format m×n where m is the number of rows and n is the number of columns. A signal vector here comprises a number of signals.

In order to separate eigenmodes of the self-interference channel a decomposition is performed on the self-interference matrix $H_0$ dividing the self-interference matrix in a number of eigenmodes wherein said filtering matrix is constituted of vectors that are orthogonal to said at least one eigenmode of the self-interference channel that is/are to be cancelled.

In one example of the invention decomposition is accomplished by the multi-antenna device performing singular value decomposition (SVD) on the self-interference channel matrix $H_0$ where $H_0$ is an $N_1 \times N_2$ matrix. The SVD of $H_0$ is given by:

$$H_0 = U_0 S_0 V_0^H$$

where $U_0$ is a unitary (orthonormal) $N_1 \times N_1$ matrix, $N_1$ being the number of input antennas 310, containing the left singular vectors, $S_0$ is a diagonal $N_1 \times N_2$ matrix, $N_2$ being the number of output antennas, containing the singular values along its main diagonal in a decreasing order, and $V_0$ is a unitary $N_2 \times N_2$ matrix containing the right singular vectors. $V_0^H$ is the complex conjugate transpose of $V_0$ where the H stands for Hermitian transpose. The row and column vectors in a unitary matrix are orthogonal to each other, i.e.

$$U_0^H U_0 = I_{N_1} \text{ and } U_0 U_0^H = I_{N_1}$$

where $I_N$ is the N×N identity matrix. $U_0^H$ is the complex conjugate transpose of $U_0$.

Eigenmodes are the modes in the self-interference channel and are found by a SVD. Each singular value has a corresponding left and right singular vector. Each such set of a singular value, a right and a left singular vector is referred to as an eigenmode. The singular value is a measure of the strength of the eigenmode.

A receive filter defined by a receive filtering matrix $W_r$, also called a spatial filter, that cancels the $n_0$ strongest eigenmodes (corresponding to the $n_0$ first singular values of $H_0$) is then given by (using Matlab notation) $W_r = U_0^H(:, n_0+1: N_1)$. The notation within parentheses means all rows (denoted by :) and columns from $n_0+1$ to $N_1$. When this receive filtering matrix is applied as receive filter on the received signal vector x it yields:

$$W_r x = W_r H_1 s + W_r H_0 y + W_r n_1$$

In this expression the self-interference is defined by the product $W_r H_0$ which now comprises a new and now reduced interference component:

$$W_r H_0 = U_0^H(:, n_0+1: N_1) U_0 S_0 V_0^H = [0_{(N_1-n_0) \times n_0} I_{N_1-n_0}] S_0 V_0^H$$

The expression $[0_{(N_1-n_0) \times n_0} I_{N_1-n_0}]$ means a matrix with $N_1-n_0$ rows and $n_0$ columns filled with only zeros concatenated from the right with an identity matrix with $N_1-n_0$ rows and columns. Concatenation is a well known matrix operation meaning the joining of two matrices. That is, the $n_0$ strongest eigenmodes of the self-interference channel are cancelled by applying this particular choice of receive filter, defined by the receive filtering matrix $W_r$.

In other examples of the invention, one can apply a transmit filter at the output side of the multi-antenna device, defined by a transmit filtering matrix given by $W_t = V_0(:, n_0+1: N_2)$ which will lead to, in analogy with the explanation of the receive filter above, the following reduced interference component $$H_0 W_t = U_0 S_0 V_0^H V_0(:, n_0+1:N_2) = U_0 S_0 \begin{bmatrix} 0_{n_0 \times (N_2-n_0)} \\ I_{N_2-n_0} \end{bmatrix}$$

The expression $$\begin{bmatrix} 0_{n_0 \times (N_2-n_0)} \\ I_{N_2-n_0} \end{bmatrix}$$

means the transpose of a matrix with $n_0$ rows and $N_2-n_0$ columns filled with only zeros concatenated from below with an identity matrix with $N_2-n_0$ rows and columns.

Hence, the above transmit filter will also cancel the $n_0$ strongest eigenmodes of the self-interference channel.

It is unnecessary to cancel the same eigenmodes of the self-interference channel using both receive and transmit filtering. A better approach is instead to let the receive and transmit filters cancel different eigenmodes of the self-interference channel. For example, the receive filter can cancel the first eigenmode of the self-interference channel while the transmit filter can cancel the second eigenmode. They will then together cancel two eigenmodes, one for each filter. The above example is accomplished by the filter choices, defined by the following receive and transmit filtering matrices:

$$W_r = U_0^H(:,[2 \ldots N_1]) \text{ and } W_t = V_0(:,[1\ 3 \ldots N_2])$$

The filters can be seen as beamforming filters that null the strongest interference directions. Expressed in linear algebra terminology it means that they project the received and/or transmitted signal vector into a lower dimensional (sub-) space, where the self-interference is smaller or sometimes even zero. If the self-interference is zero, then this lower dimensional subspace is the null space of the self-interference channel matrix. But for this to happen the self-interference matrix has to be low rank since it is only low rank matrices that have null spaces. If the self-interference channel does not have a null space then the receive and/or transmit filters will project the signal vector into a subspace that contain a small amount of self-interference. The amount of self-interference in this subspace, is given by the singular values of the eigenmodes of the self-interference channel matrix that were not cancelled, i.e., the smaller singular values. One can say that the smaller non-zero singular values, and their corresponding singular vectors, represent the approximate null space of the self-interference channel.

Figure 5:
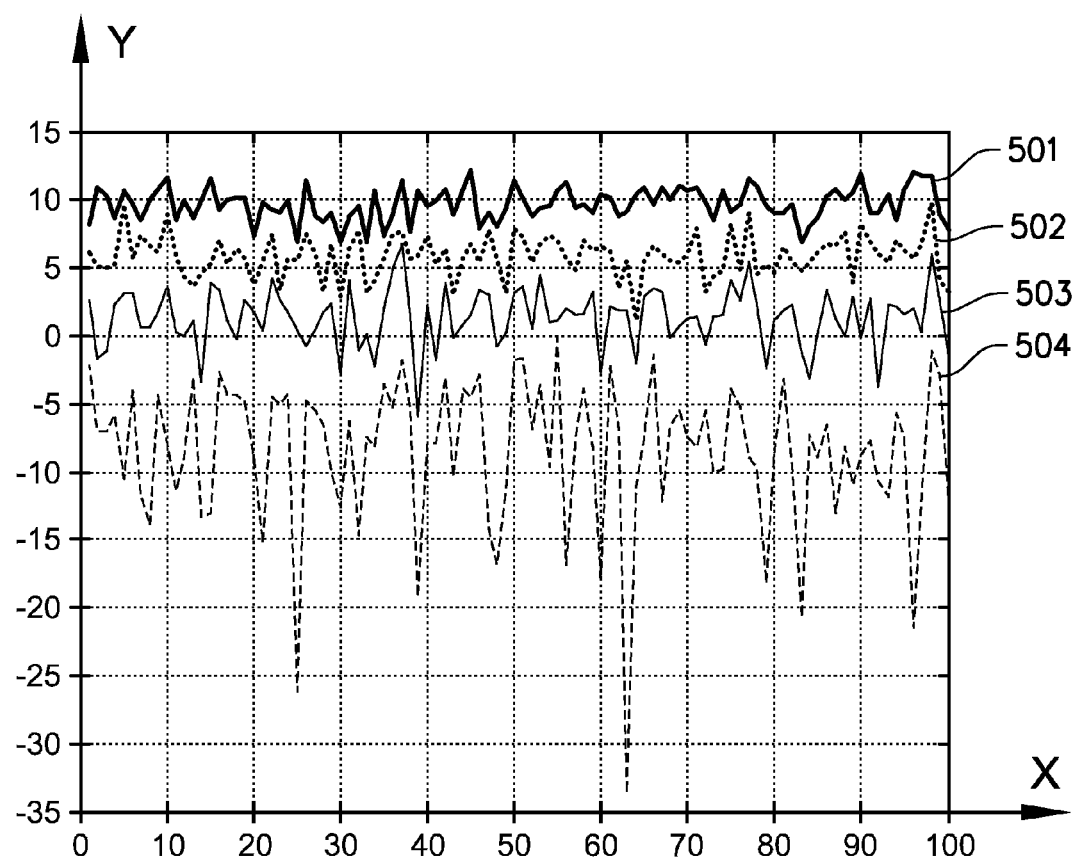
FIG. 5 shows an example of a graph of ordered singular values of 100 independent MIMO channels.

In FIG. 5 the gains of the four ordered singular values, (i.e. singular values arranged in decreasing order) of 100 independent 4×4 i.i.d. (independent and identically distributed) Rayleigh distributed MIMO channels are shown. A Rayleigh distribution is a continuous probability density function well known to the skilled person. The i.i.d. Rayleigh distributed channel represents a rich channel with zero correlation. A rich channel is typically a high rank channel. A full rank channel means that all channel vectors, i.e. all columns in the channel matrix are linearly independent. A rich channel corresponds to the situation where there is independent multiple propagation caused by multipath wave propagation and scattering.

The channel realization number is shown on the x-axis and the gains expressed in dB as 20 times the base 10 logarithm of the singular values of a first, 501, a second, 502, a third, 503 and a fourth, 504, singular value is shown on the y-axis. The curve corresponding to the first singular value 501 is drawn continuous bold, the second as dotted, the third as continuous and the fourth as dashed. From FIG. 5 it is evident that even for these kinds of rich channels there is a large gain difference between the largest and smallest singular values. For less rich channels the gain difference will be even larger. Here, the average gain or power difference between the largest and the smallest singular values is 17 dB, corresponding to the average difference between the first 501 and the fourth 504 singular values, and on average 98% of the total power resides in the first three eigenmodes. The power of an eigenmode corresponds to its singular value squared. Furthermore, 89% of the total power resides in the first two eigenmodes. It is indeed no coarse approximation to say that even the 4×4 i.i.d. Rayleigh distributed channel has an approximate null space of at least dimension 1. These kinds of null space approximations become even more accurate as the number of antennas is increased. Sub- and null spaces as well as dimensions of spaces, eigenmodes, and singular values are well known terms in linear algebra.

Until now we have only considered self-interference cancellation without considering effects on the transmit and receive channels. For example, in a multi-stream transmission/reception context using Multiple Input Multiple Output (MIMO) techniques it is a further advantage to preserve the end-to-end (E2E) channel rank. To achieve this one has to carefully design the relay self-interference cancellation scheme such that the E2E channel rank is preserved. However, in some situations it might be motivated to sacrifice E2E channel rank on behalf of self-interference capability. Furthermore, the case might be that the self-interference channel shares dimensions with other channels that are undesired to cancel out. Suppose that a substantial part of the signal vector transmitted over the transmit channel resides in same sub space that is spanned by the strongest eigenmodes (dimensions) of the self-interference channel. Then a projection of the received signal vector into the null space of the self-interference channel will also cancel substantial parts of the desired signal vector. It can therefore be advantageous to avoid this to happen. To exemplify one use of this invention, it may be so that the strongest eigenmode of the self-interference channel belongs to the same sub space as the strongest eigenmode of the transmit channel while, however, the strongest eigenmode of the self-interference channel does not belong to the same subspace as any of the important eigenmodes of the receive channel. If this is the case then we simply cancel that particular eigenmode of the self-interference channel on the transmit side of the multi-antenna device or vice versa. The idea in this example of the invention is to cancel strong (dominating) eigenmodes (dimensions) of the self-interference channel by carefully choosing on which side to do so by taking into consideration the transmit and receive channels. In this example of the invention one makes sure that applying a receive filter based on $U_0$ does not cancel dominant eigenmodes in the transmit channel, if so, a transmit filter may be applied based on $V_0$ if it does not cancel dominating eigenmodes of the receive channel. Since the transmit and receive channels are defined by independent random matrix processes it is an unlikely event that they both share important eigenmodes with the self-interference channel. So if it is not possible to cancel an interfering eigenmode on one side, it can be made on the other side.

When two filtering matrices are used, the invention can use a selection criterion to select which eigenmode to cancel using which filtering matrix. The self-interference suppression by cancelling a certain eigenmode is then made with the filtering matrix arrangement meeting a selection criterion for minimizing risk of loss of one or several dominating eigenmodes of the transmit channel and/or the receive channel.

To form a decision basis on how to select the self-interference suppression we look at the amount of power in the transmit channel that is lost by applying $W_r$ as a receive filter and compare it to the amount of power lost in the receive channel by applying $W_t$ as a transmit filter for cancellation of the same eigenmode, say the $r^{th}$ one. Pseudo code for an example of such an algorithm is given by If
$$\|U_0^H([1 \ldots r-1\ r+1 \ldots N_1])H_1\|_F^2 <$$
$$\|H_2 V_0([1 \ldots r-1\ r+1 \ldots N_2])\|_F^2$$

then let the $r^{th}$ eigenmode be cancelled by the receive filter that is based on $U_0$ else let the eigenmode be cancelled by the transmit filter that is based on $V_0$.

The notation $\|X\|_F^2$ stands for the square of the well known Frobenius norm of the matrix X and gives a measure of the power of the X matrix. This is an example of a selection criterion being a power loss criterion where the amount of power lost in the transmit channel by applying the receive filtering matrix arrangement RF for cancellation of a certain eigenmode is compared to the power lost in the receive channel by applying the transmit filtering matrix arrangement TF for cancellation of the same certain eigenmode. The filtering matrix arrangement giving the lowest power loss is selected. To eliminate the effect of different path losses of the receive and transmit channels one may normalize the receive and transmit channel matrices to e.g. unit norm prior to employing a selection criterion that is based on power loss.

Figure 6:
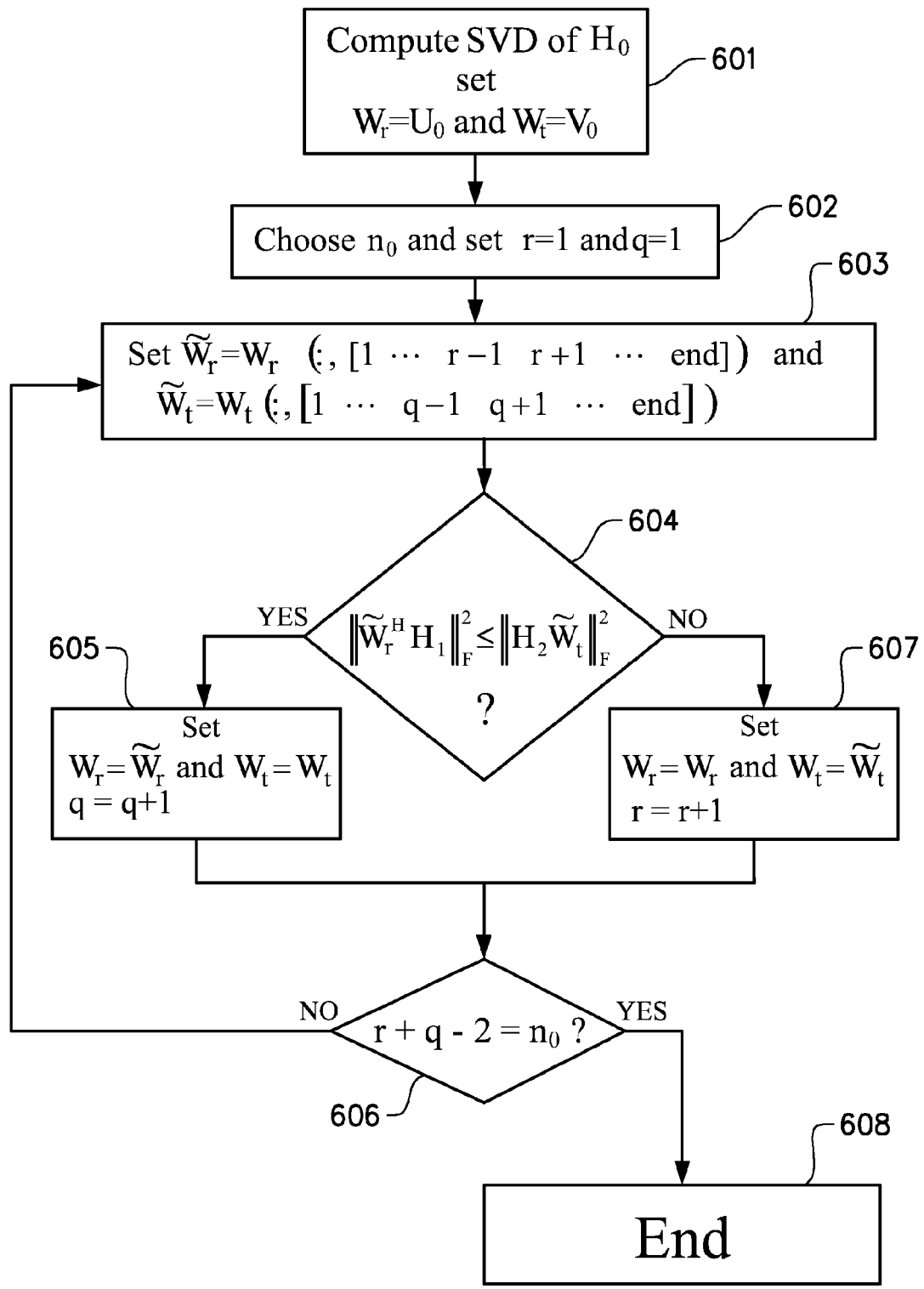
FIG. 6 shows a flow chart with an example of part of the method of the invention using SVD and a power selection criterion.

As an alternative to a power loss criterion as described above, other criteria can be used as e.g. criteria based on:
  Mutual information loss
  SNR per stream loss
  Rank matching
  Rate matching FIG. 6 shows a flow chart of an example of a self-interference algorithm comprising details of the step 2 of the method of the invention using power loss as a selection criterion.

In a first, SVD step, 601, SVD of the self-interference channel $H_0 = U_0 S_0 V_0^H$ is computed and $W_r$ is set to $U_0$ and $W_t$ to $V_0$.

In a second, mode selection step, 602, the $n_0$ strongest interfering eigenmodes to cancel are chosen and r is set to 1 and q is set to 1.

In a third initiating step, 603, the receive and transmit filtering matrices are set to following initial values:
$$\tilde{W}_r = W_r(:,[1 \ldots r-1\ r+1 \ldots \text{end}]) \text{ and}$$
$$\tilde{W}_t = W_t(:,[1 \ldots q-1\ q+1 \ldots \text{end}])$$

The notations in the third initiating step, 603, above means that you pick all rows (the first colon) and columns 1 to and including r−1 followed by columns r+1 to and including the last column (end).

In a fourth, selection step, 604, the power lost in the transmit channel is compared to the power lost in the receive channel by applying the receive and transmit filtering matrices defined in the third initiating step, 603. This is performed by comparing the Frobenius expressions:
$$\|\tilde{W}_r^H H_1\|_F^2 \leq \|H_2 \tilde{W}_t\|_F^2$$

If the power lost in the transmit channel, defined by $H_1$, is less or equal than the power lost in the receive channel, defined by $H_2$, the self-interference algorithm proceeds to a fifth, receive filter step, 605, where following settings are made:
$$W_r = \tilde{W}_r \text{ and } W_t = W_t \text{ and } q = q+1$$

after which the process proceeds to a sixth, comparison step, 606, where a check is made if $r+q-2 = n_0$. If this is true then $n_0$ eigenmodes have been cancelled, the process is terminated and filters defined by filtering matrices $W_r^H$ respective $W_t$ are applied. If false, the process goes back to the third step, 603, where the updated values of r and q are applied and a new loop is initiated.

If the answer in the fourth, comparison step 604 is no, the process proceeds to a seventh, transmit filter step, 607, where following settings are made:
$$W_r = W_r \text{ and } W_t = \tilde{W}_t \text{ and } r = r+1$$

after which the process proceeds to the sixth, comparison step, 606, where a check is made if $r+q-2 = n_0$. If this is true then $n_0$ eigenmodes have been cancelled, the process is terminated and filters defined by $W_r^H$ respective $W_t$ are applied. If false the process goes back to the third step, 603, where the updated values of r and q are applied and a new loop is initiated.

In some situations a "matrix filling" has to performed to the filtering matrices $W_r$ respective $W_t$ after ending the self-interference algorithm as described above. As an example, this could be the case when the relay unit comprises an AF function as described above. It could be necessary to adjust the number of columns in the transmit or receive filter (it is columns prior to Hermitian transpose of the receive filter, otherwise rows) in the case when the receive filter has more or less columns than the transmit filter. In the case when the receive filter has $n_1$ columns it means that $n_1$ signals shall be amplified in the AF function. All of these amplified $n_1$ signals should then enter the transmit filter. However, if the transmit filter has fewer or more columns than $n_1$, this does not match. The effect will be as a matrix multiplication that does not match due to wrong matrix sizes. In order to solve this, a number of columns may be repeated in the filter having the least number of columns such that this matrix is filled to have as many columns as the other matrix. In general this "matrix filling" can be made with any linear combination of its original column vectors since any linear combination of the column vectors lie in the space spanned by the original column vectors which guarantees that the additional column vectors used for filling are also orthogonal to the eigenmodes of the self-interference channel to be cancelled. When the relay unit comprises a DF function this "matrix filling" is not necessary as all data streams from the $n_1$ received and filtered signals are decoded. It is then possible to forward $p \leq n_1$ decoded data streams to a transmit filter defined by a transmit filtering matrix of size $N_2 \times p$. In the case of a DF relay, p does thus not necessarily have to be equal to $n_1$. This "matrix filling" is thus needed in some applications in order to be able to perform a matrix multiplication.

Referring back to FIG. 3 it is shown that the multi-antenna device, and thus also the node, comprises a relay unit 302. The relay unit is located between the receive and transmit filters. The relay unit can comprise standard functions for an AF, DF or EF relay or a repeater. As an example the relay unit comprises functions for amplifying the signals, the multi-antenna device is thus operating as an Amplify and Forward, AF, relay or the relay unit also comprises a function for error correction prior to forwarding, the multi-antenna device thus operating as a Decode and Forward, DF, relay.

As described earlier, a filtering matrix arrangement can be inserted between the antennas and the relay unit at a side of the multiple-antenna device having at least two antennas. In the example of FIG. 3 both sides of the multi-antenna device has more than two antennas, i.e. $N_1 \geq 2$ and $N_2 \geq 2$, which means that it is possible, but not necessary, that filtering matrix arrangements can be applied at both sides, the input side and the output side of the multi-antenna device. In the example of FIG. 3, filtering matrix arrangements are applied at both sides of the multi-antenna device. In alternative examples of the invention, a filtering matrix could be applied only at the receive side (provided $N_1 \geq 2$) or only at the transmit side (provided $N_2 \geq 2$).

As mentioned the filtering matrix arrangements have an antenna side facing the antennas and a relay side facing the relay unit. In the case of a receive filtering matrix, the antenna side is also called an input end, as signals are received at this side, and the relay side is called an output end, as signals are sent from this side. In the case of a transmit filtering matrix, the relay side is also called an input end, as signals are received at this side, and the antenna side is called an output end, as signals are sent from this side.

In one example of the invention, when two filtering matrix arrangements RF, TF are used, the receive filtering matrix arrangement RF, is, as explained, defined by the receive filtering matrix $W_r$ and the transmit filtering matrix arrangement TF, is, as explained, defined by the transmit filtering matrix $W_t$. The input end at the antenna side of the receive filtering matrix arrangement is connected to the input antennas 310 and the output end at the relay side to the relay unit 302, and the input end at the relay side of the transmit filtering matrix arrangement is connected to the relay unit and the output end at the antenna side to the output antennas 311. The arrangements for the receive filtering matrix and the transmit filtering matrix can be separate units or fully or partly integrated with the relay unit.

The multi-antenna device also comprises a calculation module 305 with a first connection 307 to the receive filter and a second connection 308 to the transmit filter. The multi-antenna device further comprises an updating module 306 having a third connection 309 to the calculation module 305.

The estimated channel matrices are arranged to be updated in the channel updating module 306 by standard means such as pilot signals. The frequency of the updating can vary within wide limits depending on type of application. In a mobile communications system the updating is more or less continuous in contrast to a fixed wireless system where the updating frequency can be lower.

The updated channel matrices are fed to the calculation module 305 arranged for calculation of the filtering matrices and preferably also the selection criterion based on the updated channel matrices.

The channel updating module 306 and the calculation module 305 can be separate units in the multi-antenna device, as illustrated in FIG. 3, or partly or fully integrated with the relay unit.

When the filtering matrices and the selection criterion have been calculated, this information is fed to the receive filter through the first connection, as in the example of FIG. 3, and through the second connection to the transmit filter. The receive and transmit filters comprise hardware for connection to the antennas and the relay unit as explained. The receive and transmit filter also comprises a Processing module such as a Digital Signal Processor (DSP), Application Specific Integrated Circuit (ASIC) or Field Programmable Gate Array (FPGA) realizing the filtering matrices and selection criteria with software, by conventional means. The calculation and updating modules can be realized in the same manner using a Processing module and software.

The hardware of the receive and transmit filters RF, TF for connections to the antennas and relay unit comprise input ports arranged to feed received signals to the Processor module and output ports arranged to deliver output from the receive and/or transmit filtering matrix arrangement RF, TF. The Processor module comprises:
  decomposition software arranged to perform decomposition of the self-interference matrix $H_0$ dividing the self-interference matrix in a number of eigenmodes, said filtering matrix being constituted of those singular vectors of the self-interference matrix $H_0$ that are orthogonal to said at least one eigenmode of the self-interference channel that is/are to be cancelled and
  filter software arranged to perform a multiplication of a received signal vector from the input antennas at the multi-antenna device with the receive filtering matrix $W_r$ and/or a multiplication of a transmitted signal vector from the relay unit with the transmit filtering matrix $W_t$ and to output the result to the output ports.

The invention also includes a method and a node wherein:
  the channel matrices are updated, or arranged to be updated, in a channel updating module 306 by standard means such as pilot signals,
  the updated channel matrices are used in, or fed to, a calculation module 305 for calculation of the filtering matrices and preferably also the selection criteria, or arranged for calculation of the filtering matrices and preferably also the selection criteria, based on the updated channel matrices and
  the channel updating module and the calculation module can be separate units in the multi-antenna device 301 or partly or fully integrated with the relay unit 302.

In the method of the invention the transmit channel matrix $H_1$, the receive channel matrix $H_2$ and the self-interference matrix $H_0$ are thus updated in the channel updating module.

If the receive channel is unknown at the multi-antenna device one can apply alternative selection criteria and self-interference algorithms that do not use specific channel information of the receive channel, for protection e.g. use rank $r_k$ transmission over the receive channel defined by $H_2$ where $r_k$ is less than or equal to the number of antennas on the output side of the multi-antenna device. For example, if the rank $r_k$ is equal to the number of streams detected on the input side of a DF relay, that is, $r_k$ is the rank of the transmit channel, then $N_2 - r_k$ left over (if any) antennas may be used for self-interference suppression on the output side of the multi-antenna device. However, if the transmit filter is applied for self-interference suppression without employing any knowledge of the receive channel then the system will risk cancelling dominant eigenmodes of the receive channel. One can also think of another example of the invention where the multi-antenna device mimics a base station in e.g. evolved node B, (eNB) in a Long Term Evolution (LTE) system (the receiver will experience the multi-antenna device as an eNB). The receiver will then feed back channel rank indicator (RI), precoding matrix indicator (PMI), and channel quality indicator (CQI). Based on the information provided, the multi-antenna device can form a better transmit filter compared to the simple one mentioned above, using e.g. a power loss criterion, since it can make sure to e.g. protect the preferred precoder and rank.

In the examples of the invention when a selection criterion is used it is possible to balance the available Degrees Of Freedom, DOF, (provided by multiple antennas) between self-interference mitigation and channel protection. This means that self-interference suppression can be accomplished without to an unnecessary large extent decrease the overall channel rank between the transmitter and receiver. DOF is a well known term in the art and means that when there are a number of antennas in e.g. a MIMO configuration, you have a certain freedom of how each antenna can be used. If you choose to use the antennas for self-interference suppression, it means that you use or sacrifice DOF in preference for self-interference suppression. The self-interference is reduced but not at any cost. There is thus, when a selection criterion is used, a trade off between self-interference suppression and channel protection. With reduced self-interference the multi-antenna device can increase its transmit gain in AF operation without risking self-oscillation and instability and it can enhance its detection performance in DF operation.

Figure 7:
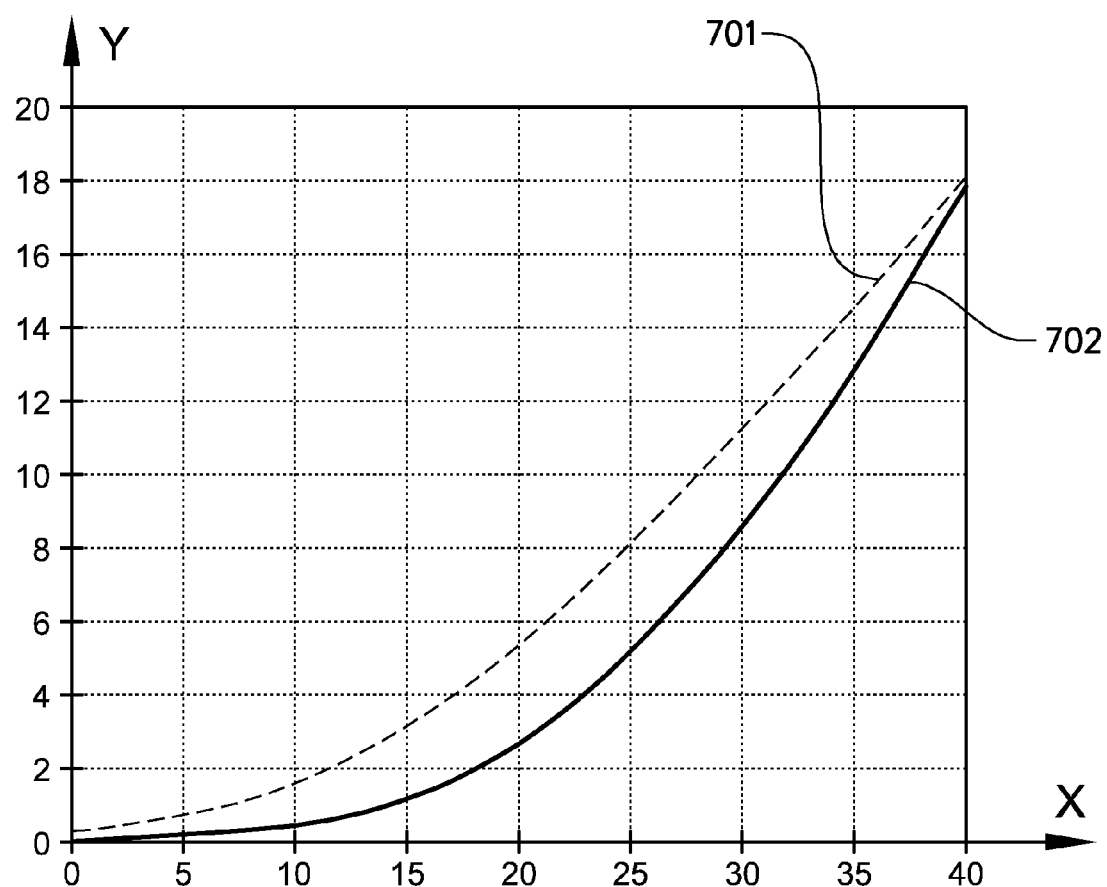
FIG. 7 schematically shows an example of a simulated result when the invention is implemented in an AF relay.

FIG. 7 shows the results from a numerical example where the disclosed invention is implemented in an AF relay. FIG. 7 shows the capacity in bits per second and Hertz (bps/Hz) on the Y-axis versus the parameter p on the X-axis, where p corresponds to a transmitted power level from the Tx. A first curve 701 shows the result with the self-interference cancellation of the invention implemented and a second curve 702 shows the result without the self-interference cancellation implemented. In this example, ρ=0 dB and ρ=40 dB approximately corresponds to the received Signal-to-Noise ratios −10 dB and +30 dB at the Rx, respectively, for the case when using the disclosed self-interference cancellation of the invention. For the case without self-interference cancellation the received SNR is typically lower since the gain of the multi-antenna device is limited due to the presence of a strong self-interference channel. The simulated SNR range reflects typical SNR values in a wireless communication system. Furthermore, in this example the gain of the multi-antenna device is set such that it is 15 dB below the attained isolation between the output and input sides of the multi-antenna device. This is done to ensure stability. Finally, all channels are modelled as independent 4×4 i.i.d. Rayleigh distributed channels and the number of self-interference eigenmodes that are cancelled is set to $n_0=2$. In the example of FIG. 7 the flow chart of FIG. 6 has been used together with the "matrix filling" feature described above.

FIG. 7 shows that the disclosed method and node of the invention gives a substantial capacity increase over the transmitted power range corresponding to a typical SNR range in a wireless communication system, thanks to its ability to employ a larger gain setting in the multi-antenna device without risking instability due to the self-interference channel.

The invention is not limited to the embodiments and examples described above, but may vary freely within the scope of the appended claims.

The invention claimed is:

1. A method for self-interference suppression in a multi-antenna device that is part of a communication channel between a transmitter and a receiver of a wireless communication system the multi-antenna device being located between the transmitter and the receiver and using antennas and a relay unit for forwarding signals from the transmitter to the receiver, the communication channel having a transmit channel, defined by a transmit channel matrix between the transmitter and the multi-antenna device, a receive channel defined by a receive channel matrix, between the multi-antenna device and the receiver, and a self-interference channel between an output and an input side of the multi-antenna device, the self-interference channel being defined by a self-interference channel matrix, the method comprising:
  equipping the multi-antenna device with at least four antennas of which at least two antennas are input antennas (310) located at the input side facing the transmit channel and at least two antennas are output antennas located at the output side facing the receive channel; and
  suppressing the self-interference channel by using two filtering matrix arrangements, (i) a receive filtering matrix arrangement being inserted between the input antennas and the relay unit and (ii) a transmit filtering matrix arrangement being inserted between the output antennas and the relay unit, wherein
  the receive filtering matrix arrangement is defined by a receive filtering matrix $W_r$,
  the transmit filtering matrix arrangement is defined by a transmit filtering matrix $W_t$, and
  said transmit and said receive filtering arrangements cancel at least one eigenmode of the self-interference channel, by choosing columns of the transmit and the receive filtering matrices to be orthogonal to said at least one eigenmode of the self-interference channel that is to be cancelled, the self-interference suppression by cancelling said at least one eigenmode is made with the transmit and the receive filtering matrix arrangements meeting a selection criterion for minimizing risk of loss of one or several dominating eigenmodes of one or both of the transmit channel and the receive channel.

2. The method according to claim 1, wherein the wireless communication system is an Orthogonal Frequency Division Multiplexing, OFDM, system.

3. The method according to claim 1, wherein the transmit channel matrix, the receive channel matrix and the self-interference matrix are updated in a channel updating module.

4. The method according to claim 1, wherein a decomposition is performed on the self-interference matrix dividing the self-interference matrix in a number of eigenmodes and wherein said one or both of the transmit and the receive filtering matrix arrangements is constituted of vectors that are orthogonal to said at least one eigenmode of the self-interference channel that is/are to be cancelled.

5. The method according to claim 4, wherein the decomposition is accomplished by the multi-antenna device performing a Singular Value Decomposition, SVD, on the self-interference channel matrix ($H_0$) where the SVD of the self-interference channel matrix ($H_0$) is given by:

$$H_0 = U_0 S_0 V_0^H$$

where $U_0$ is a unitary $N_1 \times N_1$ matrix, $N_1$ being the number of input antennas, containing left singular vectors, $S_0$ is a diagonal $N_1 \times N_2$ matrix, $N_2$ being the number of output antennas, containing the singular values along its main diagonal in a decreasing order, $V_0$ is a unitary $N_2 \times N_2$ matrix containing right singular vectors and $V_0^H$ being the complex conjugate transpose of $V_0$.

6. The method according to claim 1, wherein the receive filtering matrix $W_r$ is given by:

$$W_r = U_0^H(:,n_0+1:N_1)$$

where $U_0^H$ is the complex conjugate transpose of $U_0$, the receive filtering arrangement thus cancelling the $n_0$ strongest eigenmodes of the self-interference channel.

7. The method according to claim 1, wherein the transmit filtering matrix $W_t$ is given by:

$$W_t = V_0(:,n_0+1:N_2)$$

the transmit filtering arrangement thus cancelling the $n_0$ strongest eigenmodes of the self-interference channel.

8. The method according to claim 1, wherein the selection criterion is a power loss criterion where the amount of power lost in the transmit channel by applying the receive filtering matrix arrangement for cancellation of the at least eigenmode is compared to the power lost in the receive channel by applying the transmit filtering matrix arrangement for cancellation of the at least eigenmode and the filtering matrix arrangement giving the lowest power loss is selected.

9. The method according to claim 1, wherein the receive filtering matrix arrangement and the transmit filtering matrix arrangement are cancelling different eigenmodes of the self-interference channel.

10. The method according to claim 1, wherein:
the transmit, the receive, and the self-interference matrices are updated in a channel updating module,
the updated transmit, receive, and self-interference matrices are used in a calculation module for calculation of the transmit and the receive filtering matrices and the selection criteria based on the updated transmit, receive, and self-interference matrices, and
the channel updating module and the calculation module can be separate units in the multi-antenna device or partly or fully integrated with the relay unit.

11. A node in a wireless communication system, comprising:
a multi-antenna device that is part of a communication channel between a transmitter and a receiver, wherein
the multi-antenna device is located between the transmitter and the receiver,
the multi-antenna device comprises at least four antennas and a relay unit for forwarding signals from the transmitter to the receiver,
the communication channel comprises a transmit channel, defined by a transmit channel matrix, extending between the transmitter and the multi-antenna device, a receive channel, defined by a receive channel matrix, extending between the multi-antenna device and the receiver, and a self-interference channel extending between an output and an input side of the multi-antenna device, the self-interference channel being defined by a self-interference channel matrix,
at least two of said at least four antennas are input antennas located at the input side facing the transmit channel and at least two of said at least four antennas are output antennas located at the output side facing the receive channel,
the multi-antenna device further comprises a receive filtering matrix arrangement arranged between the input antennas and the relay unit and a transmit filtering matrix arrangement arranged between the output antennas and the relay unit,
the receive filtering matrix arrangement is defined by a receive filtering matrix $W_r$,
the transmit filtering matrix arrangement is defined by a transmit filtering matrix $W_t$,
the transmit and said receive filtering arrangements being arranged to cancel at least one eigenmode of the self-interference channel, by the columns of the transmit and the receive filtering matrices being arranged to be orthogonal to said at least one eigenmode of the self-interference channel that is to be cancelled,
the multi-antenna device further comprises a calculation module connected to the receive and transmit filtering matrix arrangements,
the calculation module is a separate unit in the multi-antenna device or partly or fully integrated with the relay unit,
the calculation module is arranged to calculate a selection criterion for minimizing risk of loss of at least one dominating eigenmode of one or more of i) the transmit channel and ii) the receive channel, and
at least one of the transmit and the receive filtering matrix arrangements meeting the selection criterion.

12. The node according to claim 11, wherein the one or more of the transmit and the receive filtering matrix arrangements has an antenna side and a relay side, the antenna side having separate connections to each antenna located at one of the sides of the multi-antenna device and the relay side having connections to the relay unit.

13. The node according to claim 11, wherein the wireless communication system is an Orthogonal Frequency Division Multiplexing, OFDM, system.

14. The node according to claim 11, wherein an input end at the antenna side of the receive filtering matrix arrangement being connected to the input antennas and an output end at the relay side to the relay unit, and an input end at the relay side of the transmit filtering matrix arrangement being connected to the relay unit and an output end at the antenna side to the output antennas, the arrangements for the receive filtering matrix and the transmit filtering matrix can be separate units or fully or partly integrated with the relay unit.

15. The node according to claim 11, wherein the one or more of the receive and the transmit filtering matrix arrangements comprise input ports arranged to feed received signals to a Processor module and output ports arranged to deliver output from the receive and/or transmit filtering matrix arrangement, the Processor module comprises:
decomposition software arranged to perform decomposition of the self-interference matrix dividing the self-interference matrix in a number of eigenmodes, said self-interference matrix being constituted of those singular vectors of the self-interference matrix that are orthogonal to said at least one eigenmode of the self-interference channel that is to be cancelled and
filter software arranged to perform one or both of a multiplication of a received signal vector from the input antennas at the multi-antenna device with the receive filtering matrix $W_r$ and a multiplication of a transmitted signal vector from the relay unit with the transmit filtering matrix $W_t$ and to output the result to the output ports.

16. The node according to claim 11, wherein:
the relay unit comprises functions for amplifying the signals, the multi-antenna device operating as an Amplify and Forward, AF, relay or
the relay unit also comprising a function for error correction prior to forwarding, the multi-antenna device thus operating as a Decode and Forward, DF, relay.

17. The node according to claim 11, wherein:
the transmit, the receive, and the self-interference matrices are arranged to be updated in a channel updating module,
the updated transmit, receive and self-interference matrices are fed to the calculation module arranged for calculation of the transmit and the receive filtering matrices and the selection criteria based on the updated channel matrices, and
the channel updating module and the calculation module can be separate units in the multi-antenna device or partly or fully integrated with the relay unit.

* * * * *

UNITED STATES PATENT AND TRADEMARK OFFICE
CERTIFICATE OF CORRECTION

| | | |
|---|---|---|
| PATENT NO. | : 9,059,772 B2 | Page 1 of 1 |
| APPLICATION NO. | : 13/642233 | |
| DATED | : June 16, 2015 | |
| INVENTOR(S) | : Coldrey et al. | |

It is certified that error appears in the above-identified patent and that said Letters Patent is hereby corrected as shown below:

On the Title Page, in Item (57), under "ABSTRACT", in Column 2, Line 7, delete "unit" and insert -- unit for --, therefor.

On the Title Page, in Item (57), under "ABSTRACT", in Column 2, Line 16, delete "• quipping" and insert -- equipping --, therefor.

On the Title Page, in Item (57), under "ABSTRACT", in Column 2, Line 17, delete "• suppressing" and insert -- suppressing --, therefor.

On the Title Page, in Item (57), under "ABSTRACT", in Column 2, Line 23, delete "module that" and insert -- that --, therefor.

In the Claims:

In Column 15, Line 63, in Claim 1, delete "(310) located" and insert -- located --, therefor.

In Column 18, Line 1, in Claim 11, delete "more of" and insert -- more of: --, therefor.

Signed and Sealed this
Fifteenth Day of March, 2016

Michelle K. Lee
*Director of the United States Patent and Trademark Office*